Oct. 4, 1955
G. E. GARD
2,719,329
METHOD OF MOLDING A COMPOSITION COMPRISING
CORK GRANULES AND A BINDER
Filed March 18, 1952
2 Sheets-Sheet 1
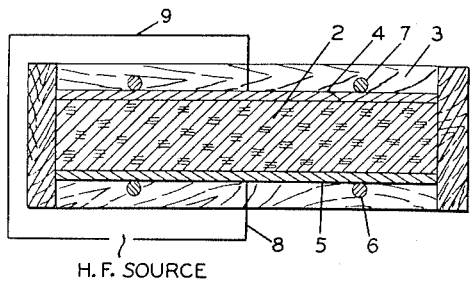
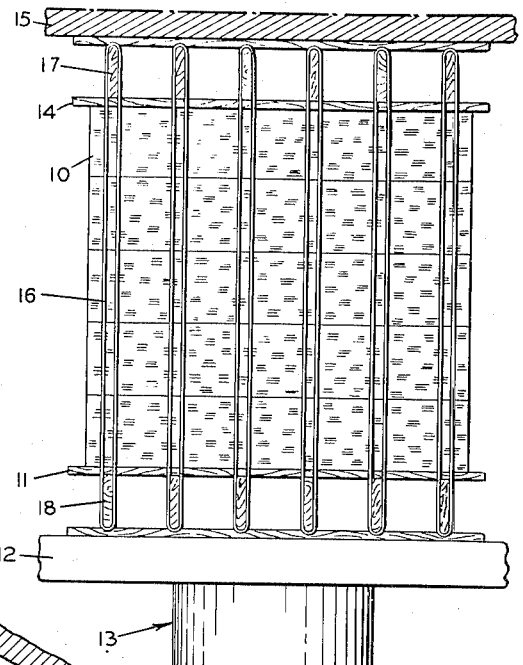
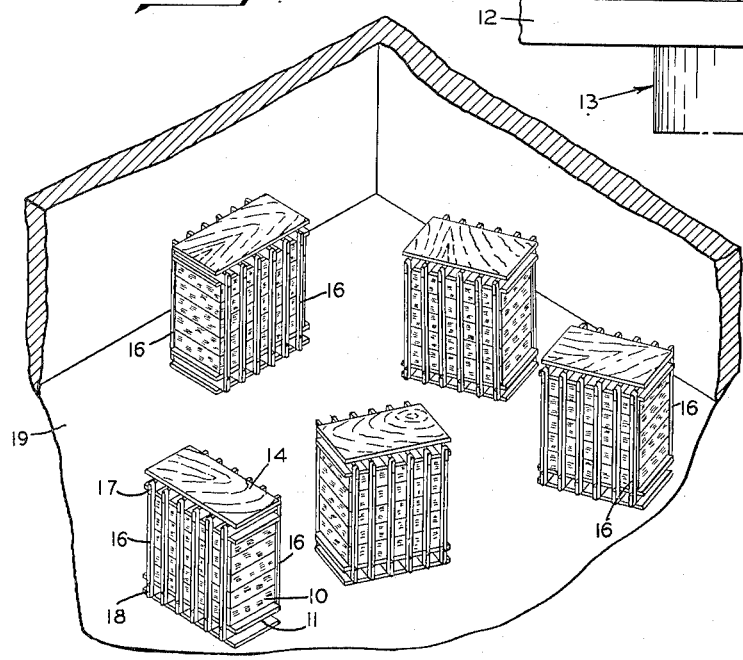
INVENTOR
GEORGE E. GARD
by
Walter F. Kaufman
ATTORNEY TEMPERATURE DISTRIBUTION—
VERTICAL CROSS SECTION OF FIVE
RECOMPRESSED DIELECTRICALLY CURED
MATS OF CORK COMPOSITION FOUR HOURS
AFTER RECOMPRESSION

United States Patent Office 2,719,329
Patented Oct. 4, 1955

2,719,329

METHOD OF MOLDING A COMPOSITION COMPRISING CORK GRANULES AND A BINDER

George E. Gard, East Hempfield Township, Lancaster County, Pa., assignor to Armstrong Cork Company, Lancaster, Pa., a corporation of Pennsylvania Application March 18, 1952, Serial No. 277,117

6 Claims. (Cl. 18—48)

This invention relates to the manufacture of cork composition from a mass of cork granules bound together with a heat-convertible binder.

Cork composition products are formed by coating granules of cork with a binder, such as a mixture of glue, glycerine, and water together with a suitable insolubilizing agent for the glue, usually formaldehyde, charging the binder-coated granules into a mold, applying pressure to the mass to reduce it to a mat of the desired dimensions, and then heating the mass to activate the binder while the mass is confined under pressure in the mold. Most commonly, the binder is activated by disposing the mold with the binder-coated cork granules within a heated chamber or oven. Another practice is to expose the mass while held under compression in the mold to the action of a high-frequency alternating electric field thus to dielectrically heat the binder to activation temperature. In either case, the mass is maintained in the mold under confinement after the heating cycle until the cork granules have "set." Thereafter, the formed and set mass is discharged from the mold and is cut into sheets or articles of other desired shape.

Cork compositions are commonly used in the preparation of sealing gaskets and the like; and for best results, the mold-formed cork composition mat should have a substantially uniform density throughout to provide gasket sheets which will be uniform in physical properties, especially their compression-recovery characteristics and tensile strength. In order to obtain a substantially uniform density in the finished product, it is necessary that the cork granules which constitute the major portion of the product be held in a fixed condition against any substantial re-expansion. It is for this reason that cork composition products are normally subjected to a mold dwell period by being maintained in the mold for a substantial period of time subsequent to the application of heat to permit the cork granules to be stress relaxed and to take what is termed a "permanent set." If this is not effected the mat will "swell" upon removal from the mold and the re-expansion of the granules will be nonuniform, the resulting product being of much lower density near the center of the mat than adjacent to the top and bottom surfaces.

This so-called "mold dwell period" may far exceed the heating time and constitutes one of the limiting factors in rapid production of cork composition products; especially is this true where dielectric heating is utilized and the heating time is in the order of a few minutes.

The mold dwell period may be reduced as disclosed in my copending application Serial No. 152,057, filed March 27, 1950, and entitled "Cork Composition Manufacture," now Patent No. 2,601,702, by employing a portion of preset cork granules in the mass together with the "prime" cork granules. This permits the mass to be discharged from the mold sooner because the preset granules require a much shorter "stress relaxation" time than do the granules of prime cork. The mold dwell period may also be reduced as disclosed in my copending application Serial No. 163,747, filed May 23, 1950, and entitled "Method and Apparatus for Heating Materials Dielectrically," now Patent No. 2,602,133, by controlling the heating of the mass so as to avoid any substantial increase in pressure exertion resulting from the development of a vapor pressure force within the mass greater than the reduction in force resulting from stress relaxation of the cork granules. In a dielectrically heated mass, this is accomplished by discontinuing the application of the high-frequency field to the mass at substantially the point of minimum pressure exertion by the heated mass during its heating. Both of the foregoing methods may be utilized together with good results.

The present invention is directed to a method of cork composition manufacture by which the mold dwell time may be reduced and, if desired, advantage may be taken of the benefits derived from the practice of my inventions referred to above, although the present invention is useful without either of them. In other words, the present method may be practiced utilizing a preset cork component, and dielectric heating of the mass may be effected with the heating being controlled in accordance with a decrease in pressure exerted by the mass as heating proceeds; or it may be practiced with prime cork and with conventional oven heating or otherwise, without especial regard to the development of objectionable vapor pressure forces within the mass.

One of the principal objects of this invention is to reduce the mold dwell period in cork composition manufacture.

Another object of the invention is to improve the quality of cork compositions, such quality improvement resulting from the attainment of a more nearly uniform density within the cork composition mat or other shape.

A further object of the invention is to reduce the cost of manufacturing cork composition by reduction of the capital investment in molds and the expense of their maintenance and by reducing the quanity of raw materials required to produce an article of a desired minimum average density.

Other objects of the invention will be obvious from consideration of the description of a number of embodiments of the invention which follow.

Theoretically with dielectric heating, were it not for the mold dwell period, only two molds would be required for mass production of cork composition mats. One mold would be being discharged and then refilled while a second was being heated dielectrically. Each operation could be performed in a few minutes. However, since the mats must be held under confinement until stress relaxation of the granules has been effected, a large number of molds are required, regardless of the rapid heating cycle and efficient and rapidly operating mold charging and mat discharging equipment. The number of molds required increases in proportion with the mold dwell period. Cork compositions of higher density require a longer mold dwell period than do lighter density compositions. Also the type of binder employed, its activation temperature, its vapor pressure, and other variable factors influence the mold dwell period to a great extent. Another factor which affects the mold dwell period is the manner of preparation of the cork granules. If the granules are formed on a buhr mill, the mold dwell period will normally be less than for similar size granules formed on an attrition mill, such as an Allis-Chalmers Interplane Grinder. The size of the granules also affects the mold dwell period, larger sized particles being more difficult to stress relax or set than smaller and finer granules. Thus a manufacturer of a full range of cork compositions of a wide density range, particle size, and binder type is required to invest in an inordinately large number of molds to produce those compositions which require a long mold dwell period.

Another factor of importance is that even though the mass be maintained within the mold for a long stress-relaxation period and a reasonably uniform density be obtained in the product, there is some variation in density which results from the nonuniform cooling of the mass from the outer surfaces which engage the mold end plates toward the center. It is well known that cork is a unique material in many respects; it is essentially truly compressible, and pressure applied in one direction serves to compress the cork in that direction with only a negligible flow of the cork in other directions. This is contrasted with rubber and similar materials which are essentially incompressible but flow under applied compression. With cork composition, therefore, if the mass cools down nonuniformly from the top and bottom surfaces toward the center, the top and bottom areas of the mat will follow a different stress-relaxation pattern than the central area. This is true because the essential expansion forces within each of the cork granules is directed toward the top and bottom surfaces of the mat, with only a minor component being directed outwardly toward the lateral edge of the mat. The result is a slightly higher density in the top and bottom portions than in the center of the mat. This is overcome by practice of one embodiment of this invention where stress relaxation is accomplished under conditions where the temperature gradient is essentially from the lateral edges of the mat toward the center, with no substantial gradient existing from top to bottom of the mat. Thus the isothermal lines within the mat substantially parallel the expansion forces, and uniform density distribution is obtained throughout the mat, eliminating almost completely any variation greater than the experimental error encountered in measuring the density of a product such as cork composition.

According to the preferred practice of this invention, cork granules coated with a heat-convertible binder are charged into a mold and compressed therein, the direction of compression being at right angles to the major flat faces of the mat to be formed. The mass is then heated, preferably dielectrically, although an oven or other heating process may be employed. The mass is maintained in the mold for a time interval adequate to partially stress relax the cork granules, at least sufficient to permit the mass to be removed from the mold without such re-expansion as would result in internal rupture of the mat. There may be some "swelling" of the mat, however. A plurality of the mats, preferably five or more, are stacked one upon another upon a pallet. A top pallet is applied and the stack of mats is compressed in the direction of the major original compression of the mass in the mold to overcome any swelling in the direction of major compression which may have occurred subsequent to removal of the mats from the molds. The mats are then confined against re-expansion, as by the use of metal straps or bands applied to the end pallets, and are permitted to stress relax, generally at room temperature in a suitable storage area. Usually the mats will be permitted to remain in the stacks under confinement for a long period of time, frequently as long as seventy-two hours. The period may be varied but should not be shorter than that required to obtain substantially complete stress relaxation of the cork granules where a product of uniform density is desired.

As mentioned previously the stress-relaxation period varies in accordance with cork particle size, density of the product, method of particle formation, vapor pressure of the binder, temperature of the mass, and other factors. Generally stress relaxation will occur most rapidly under heat but will be retarded or actually arrested completely in the presence of vapor. Therefore, it is preferred to remove the mass from the mold just as soon as possible without rupture or other damage to the mat, and stack the hot mats for recompression and banding as soon as practicable.

By stacking the hot mats one upon another, the loss of heat from the mats, especially those intermediate the upper and lower mats, is essentially from the outer peripheral edges; and, thus, the isothermal lines generally parallel the direction of applied compression, and stress relaxation is essentially uniform throughout the thickness of the mats, resulting in a final product in which the density is also essentially uniform throughout the thickness of the mats. By the use of wooden end pallets, loss of heat from the upper and lower surfaces of the outermost mats in the stack will be minimized. If desired, layers of thermal insulation may be provided, but generally this is not necessary. Any temperature gradient which may exist from the upper and lower surfaces of the mats toward the center at the time of stacking will soon level off after stacking by heat transfer from the hotter center portions, and within a short time the only essential gradient will be from the outer lateral surfaces toward the center of the stack.

In the drawings:

Figure 1 is a diagrammatic view illustrating the heat activation of the binder in the making of a mat of cork composition employing dielectric heating;

Figure 2 is a diagrammatic view illustrating the assembly of a plurality of mats and the banding of the same under confinement;

Figure 3 is a perspective view illustrating a plurality of pallets of banded mats undergoing stress relaxation in a storage area.

Figure 4:
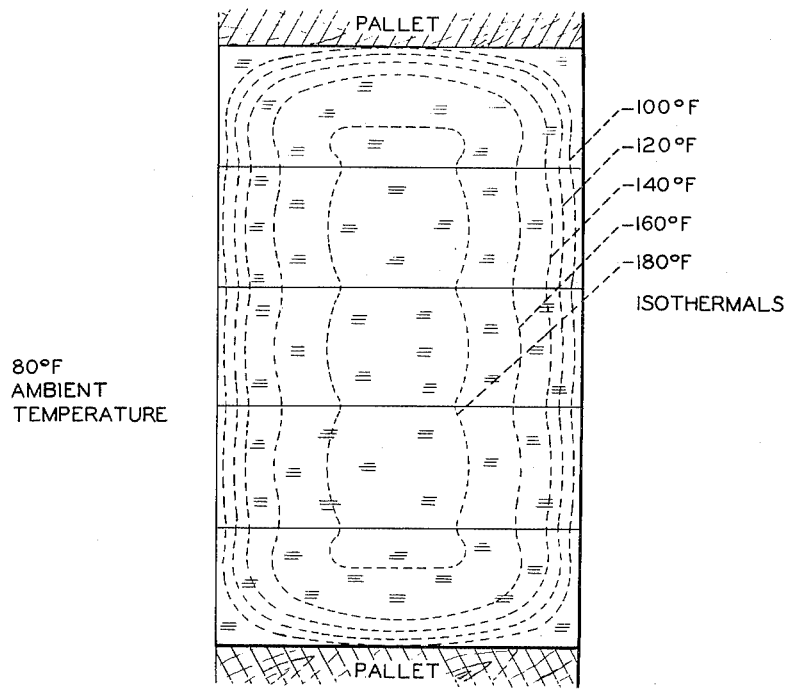
Figure 4 is a schematic view showing the isothermal lines in a plurality of mats undergoing stress relaxation.

An example of the practice of the method of this invention follows.

*Example I*

| | Parts by weight |
|---|---|
| 5 to 9 mesh cork (U. S. Standard) | 100 |
| Glycerine | 20 |
| Glue | 6.5 |
| Water | 2.5 |
| Paraformaldehyde | .52 |

In this example the cork is "prime" cork which is prepared by comminuting natural cork bark. The particle size is determined in the usual manner by a screen analysis. Glycerine is a cork-softening agent and constitutes the major liquid component of the binder. Glue is the adhesive employed, and the water is added to facilitate distribution of the glue over the cork granules. Paraformaldehyde is an agent which is effective for insolubilizing the glue. The particular heat-activatable binder employed is not significant to practice of the present invention. The invention advantageously may be employed with any heat-activatable binder useful in the manufacture of cork composition, including heat-convertible resinous binders such as phenol-formaldehyde resins; also rubber, synthetic rubber, rubber and glue mixtures, resin and glue mixtures, and others.

In the preparation of the mass for molding, the glue, glycerine, and water are mixed together. The mixture is distributed over the cork granules to provide a thin coating on them. The coated cork granules are free-flowing and are charged into the mold as shown in Figure 1, for example, where the mass has been indicated at 2 disposed within a mold 3, compressed in a direction at right angles to the mold end plates or electrodes 4 and 5 and held in compressed condition by pins 6 and 7 which are received within openings in the mold walls. The electrodes 4 and 5 are connected to a suitable high-frequency heating source by leads 8 and 9. In the manufacture of a mat 9¼" thick x 28" wide x 50" long, 133 pounds of the above mixture will be charged into the mold and compressed to reduce the volume essentially to the size stated above. This will produce a mat having a theoretical average density of about 17½ pounds per cubic foot. The loss of moisture which occurs during the baking cycle will reduce this somewhat.

The compacted mass of binder-coated cork granules disposed in the mold is heated to a temperature of about 180° F. to 200° F., effective for inducing a reaction between the glue and the paraformaldehyde which insolubilizes the glue and produces a binder which is substantially stable and not subject to deterioration under normal atmospheric conditions. Where dielectric heating of the mass in the mold is accomplished, the mass may be heated throughout in about three minutes, employing a high-frequency generator operating at approximately 13.6 megacycles and at a power level of about 80 kw.

The mass is permitted to remain in the mold subsequent to the dielectric heating for a period of time sufficient to effect partial stress relaxation of the cork granules and to achieve at least partial activation of the binder. The mat should not be broken from the mold if there is danger of actual internal rupture. The elastic strength of the binder must be developed to the point where it is sufficiently great to hold the cork granules against any major re-expansion which might result in rupture of the binder or the cork particles or both. Practically, a mat of the above formulation employing buhr mill ground prime cork of the particle size specified may be broken from the mold without likelihood of rupture in about ninety to one hundred and twenty minutes after completion of the heating cycle where the maximum temperature is about 200° F. Such a mat if allowed to remain unconfined would "grow" substantially and the density would become nonuniform. There would be a substantial decrease in the tensile strength of the composition. While theoretically the mat would have an average density of 17.5 pounds when broken from the mold, as it grows the density will decrease—actually the mat would have a minimum density not substantially above fifteen pounds per cubic foot if permitted to expand unrestrictedly and would have to be degraded and sold as 15-pound density cork composition.

With practice of the present invention, however, the mat so formed together with other mats similarly prepared, all while in a heated condition and partially stress relaxed, are stacked together in the manner indicated in Figure 2, for instance, where the mats 10 are loaded on a platform or pallet 11 disposed upon the lower platen 12 of a hydraulic press generally indicated at 13. An upper pallet 14 is positioned on top of the stack of mats 10, and platen 12 is moved toward a stationary platen 15, forming part of the hydraulic press 13. The pallets are preferably made of wood and may be constructed to withstand up to fifty pounds or more per square inch pressure. A pressure of about fifteen to twenty pounds per square inch will be adequate to compress the above mats to their original thickness and overcome any swelling which may have occurred. As noted above, the major component of applied force in the formation of the mats in the molds is at right angles to the thickness, and the major re-expansion, of course, occurs in that direction for the reason that cork is essentially truly compressible. A substantial portion of the re-expansion occurs almost immediately after the mat has been released from the mold, but there is a further gradual increase in size which takes place over a relatively long period of time. An increase in thickness to 9¾" or even more may be tolerated so long as rupture does not occur. Since stress relaxation is enhanced when the cork particles are heated, it is desirable to effect recompression of the mat as soon as practicable after release from the mold and while the mat is at an elevated temperature. Upon recompression of the mats to the desired thickness, about 9¼" each in this example, bands 16 of metal are positioned around the projecting ends of cross members 17 and 18 provided on the pallets. These cross members project from opposite sides of the pallets, and similar bands are positioned on both sides, only one being visible in Figure 2. The bands on both sides are clearly visible in Figure 3, however.

Subsequent to the positioning of the bands 16 on the pallets, the hydraulic press 13 is opened and the stacked mats on the pallet are removed from the press and disposed in a storage room, such as indicated at 19 in Figure 3. Here the mats are permitted to remain under confinement until substantially complete stress relaxation of the cork granules has occurred. Since the pallets are relatively inexpensive and since only two pallets are required for each unit of multiple mats, there is no great capital investment required and the mats may be permitted to remain on the pallets for an extended period of time. Generally a period of seventy-two hours is fully adequate; and, where storage space is at a premium and the cost of the pallets is an item of importance, the pallets may be removed after forty-eight hours or a shorter period, depending upon the nature of the cork composition being manufactured and its rate of stress relaxation. To remove the pallets, it is best to reinsert the unit in the press and apply adequate pressure to loosen the bands 16 (only about three pounds pressure per square inch are required in the above example after a twenty-four hour period of confinement on the pallets). The bands are slipped from the ends of the cross members 17 and 18 and the mats then removed and the pallets reused.

While five mats have been shown in each stack in Figures 2 and 3, this is not critical; and for optimum results, the stack should be made as tall as feasible, considering the permissible floor loading in the storage area, the height of the storage room, the loading and compressing equipment available, the rate of mat production, and other variable factors. Improved results will be achieved even though but a single mat be positioned between the pallets for stress relaxation. Where multiple stacking is practiced, control of the temperature gradient within the mats is more readily accomplished, and it is possible to have the isothermal lines substantially parallel to the direction of applied compression in original mat formation. Figure 4 plots the approximate isothermal lines in a stack of five mats of Example I after a four-hour interval of confinement. These data were obtained by the use of a thermocouple in a probe tube inserted directly into the mats. Temperature measurements were made in one quadrant of the stack, smoothed, and then plotted for the remainder of the stack. The gradient changes over the period of stress relaxation as the mats cool down, the major heat loss of the mats being from the outer peripheral surfaces, with the intermediate mats having the entire gradient extending from such surfaces toward the center but with the end mats having some heat loss to the pallets resulting in a gradient extending inwardly of the mats from the surfaces in engagement with the pallets. This gradient is of a minor nature, however, and may be further minimized by the use of insulation material between the pallets and the mats of cork composition or by otherwise limiting the transfer of heat from the outermost mats to the supporting surfaces.

As previously mentioned, optimum results are achieved when the mats are broken from the molds as soon as practicable and stacked immediately for confinement. With a three-minute operating cycle as in Example I, five mats will be accumulated each fifteen minutes. With a slower operating cycle which will be required with a denser cork composition product, for instance, it may be necessary to have a somewhat longer mold dwell time if there is any tendency for the first discharged mat to swell objectionably or actually rupture before confinement. Partially stress-relaxed mats may be out of the mold for thirty to forty-five minutes or longer where the binder has been adequately activated and stress relaxation has proceeded to a degree adequate to eliminate objectionable swelling and rupture.

While customarily it is desired to confine the stacked mats at about their original thickness, 9¼" in Example I, an increase in density may be effected in the stack by further compression of the mats at the time of banding. The amount of increase possible will depend upon the strength of the pallets. As a general rule, it is better to obtain approximately the desired density in the mold-formed product and confine the stack at about that density rather than attempt to substantially increase the density in the stack. Also, it is not desirable to attempt to secure much lighter density products in the stack, for there is considerable risk of obtaining nonuniformity in the density distribution where the mat is not confined to substantially its molded density during final stress relaxation in the stack. Also, substantial increases in length and width dimensions beyond the nominal molded dimensions may be objectionable for economic or other reasons. As noted above, while the major re-expansion occurs in the thickness of the mat, since the major compressive force is applied in the thickness direction, there are, however, increases in length and in width also.

The following is an example of a cork composition of a higher density than Example I, employing a portion of prime cork and a portion of preset cork in accordance with the teaching of my Patent 2,601,702.

*Example II*

|  | Parts by weight |
| --- | --- |
| 10 to 20 mesh cork | 75 |
| ¼ inch to dust select comminuted cork composition | 25 |
| Glycerine | 15 |
| Glue | 6.13 |
| Water | 2.5 |
| Paraformaldehyde | .52 |

The major cork component is prime cork, but there are added twenty-five parts of ¼ inch to dust select comminuted cork composition, preferably from a previous run of the same composition as set forth in Patent 2,601,702. The binder is essentially the same as Example I except for the quantity of glycerine and glue, both of which have been reformulated as set forth in Patent 2,601,702 because of the presence of the comminuted cork composition in the mixture.

The mixing procedure is the same as for Example I. To produce a mat 9¼" x 28" x 50½", 190 parts by weight of the composition of Example II are charged into a mold and compressed to the same size as Example I. This will produce a mat having a theoretical average density of about twenty-five pounds per cubic foot, although here, as in Example I, loss of water during baking will slightly reduce the average density.

If the mass is heated dielectrically with the same high-frequency generator as Example I (13.6 megacycles and a power level of about 80 kw.), a heating cycle of about four and one-half minutes will be required, with the mat attaining a temperature in the order of 180° F. to 200° F. After a mold dwell period of about three hours, the mat may be broken from the mold without rupture. This mold dwell period is longer than in Example I because of the fact that a higher density composition has been produced. The use of a component of preset cork has reduced the mold dwell period below that required for a composition of similar density with all prime cork. The mat as broken from the mold would swell objectionably if left unconfined, and a product of nonuniform density would result. However, according to the present invention, the formed mat, preferably together with a number of similarly formed mats, is placed between pallets and reduced to at least substantially its original mold density, about 9¼" in thickness in this example, held under confinement against re-expansion, and stress relaxed for a period of forty-eight to seventy-two hours. Thereafter, the mat or mats may be released from confinement. The density of the mat of Example II will be substantially uniform from top to bottom, particularly if the mat is placed while hot and within a short time interval after it has been broken from the mold as an intermediate mat in a stack so that the isothermal lines substantially parallel the direction of original major compression as stress relaxation occurs, as fully discussed in connection with Example I.

Since by practice of the present invention it is possible to achieve substantially uniform density throughout the thickness of the mats, less cork and binder need be charged into the molds in order to attain a desired minimum density than is necesary where the density is nonuniform.

As noted above, stress relaxation is accelerated while the mass of cork granules remains heated. It may be desirable, therefore, in some instances to heat the room in which the stacked mats are disposed for stress relaxation, or at least to conserve the heat of the stacked mats against excessive heat losses by eliminating excessive air motion within the room and by insulating against loss of heat. Insulating jackets may be provided to cover the stacked units to minimize heat losses.

I claim:

1. In a method of molding an article from a mass comprising cork granules and a heat-sensitive binder, the steps comprising disposing a mass of cork granules coated with a heat-sensitive binder within a mold, compressing the mass within the mold with the major compressive force being applied in one direction, heating said heat-sensitive binder to elevate the same to activation temperature, maintaining the mass within the mold subsequent to heating until partial stress relaxation of the cork granules has occurred, removing the heated formed article from the mold prior to complete stress relaxation of the cork granules, prior to any re-expansion of said granules which would result in rupture of said article placing said article under applied compression, cooling said recompressed article so that the temperature gradient within the mass is such that the isothermal lines are substantially parallel to the direction of applied compression, maintaining said formed article under confinement until substantially complete stress relaxation of the cork granules has been effected, and thereafter removing the article from confinement.

2. In a method of molding an article from a mass comprising cork granules and a heat-sensitive binder, the steps comprising disposing a mass of cork granules coated with a heat-sensitive binder within a mold, compressing the mass within the mold, heating said heat-sensitive binder to elevate the same to activation temperature, maintaining the mass within the mold subsequent to heating until partial stress relaxation of the cork granules has occurred, removing the heated formed article from the mold prior to complete stress relaxation of the cork granules, compressing the formed article to at least substantially the density of said mass when confined in said mold, cooling said formed article so that the temperature gradient within the mass is such that the isothermal lines are substantially parallel to the direction of applied compression, maintaining said formed article under confinement until substantially complete stress relaxation of the cork granules has been effected, and thereafter removing the formed article from confinement.

3. In a method of molding a rectangular mat from a mass comprising cork granules and a heat-sensitive binder, the steps comprising disposing a mass of cork granules coated with a heat-sensitive binder within a rectangular mold, compressing the mass within the mold with the direction of major compressive force being at right angles to two major flat faces of the rectangular mat, heating said binder to activation temperature and elevating the temperature of said cork granules to facilitate their stress relaxation, maintaining the mass within the mold subsequent to heating until partial stress relaxation of the cork granules has occurred, removing the heated formed mat from the mold prior to complete stress relaxation of the cork granules, prior to any re-expansion of said cork granules which would result in rupture of said mat placing said mat under compression applied at right angles to said two major flat faces of said mat to reduce the mat to at least essentially the same thickness as when confined within said mold, cooling said formed article so that the temperature gradient within the mass is such that the isothermal lines are substantially parallel to the direction of applied compression, holding said mat under confinement against re-expansion in the direction of applied pressure until substantially complete stress relaxation of the cork granules has been effected, and thereafter removing the mat from confinement.

4. In a method of forming a molded article from a mass comprising cork granules and a heat-sensitive binder, the steps comprising stacking a plurality of mold-formed articles in superposed position, said articles including a compressed body of cork granules which are in heated and only partially stress-relaxed condition and a heat-sensitive binder joining said granules into a self-sustaining body, applying compression to the stack of mold-formed articles to reduce the articles to at least essentially the same thickness as when confined during mold formation and with the compression being applied along the direction of compression in original mold formation, cooling said stack so that the temperature gradient within the mass is such that the isothermal lines are substantially parallel to the direction of applied compression until substantially complete stress relaxation of the cork granules has been effected, and thereafter removing the articles from confinement.

5. In a method of molding rectangular mats from a mass comprising cork granules and a heat-sensitive binder, the steps comprising disposing a mass of cork granules coated with a heat-sensitive binder within a rectangular mold, compressing the mass within the mold with the direction of major compressive force being at right angles to two major flat faces of the rectangular mat, heating said mass to elevate said binder to activation temperature and to elevate the temperature of the cork granules to facilitate their stress relaxation, maintaining the mass within the mold subsequent to heating until partial stress relaxation of the cork granules has occurred, removing the heated formed mat from the mold prior to complete stress relaxation of the cork granules, prior to any re-expansion of said cork granules which would result in rupture of said mat placing said mat and a plurality of other similarly formed mats in a stack, said stack including an upper and a lower mat and at least one intermediate mat, applying compression to said stack at right angles to said major flat faces of said mats to reduce said mats to at least essentially the same thickness as when confined during mold formation, cooling said stack of heated mats so that the temperature gradient within the mass is such that the isothermal lines are substantially parallel to the direction of applied compression until substantially complete stress relaxation of the cork granules has been effected, and thereafter removing the mats from confinement.

6. In a method of molding an article from a mass comprising cork granules and a heat-sensitive binder, the steps comprising disposing a mass of cork granules coated with a heat-sensitive binder within a mold, compressing the mass within the mold with the major compressive force being applied in one direction, heating said heat-sensitive binder to a temperature in the order of 180° F. to 200° F., maintaining the mass within the mold subsequent to heating for a period of at least ninety minutes until partial stress relaxation of the cork granules has occurred, removing the heated formed article from the mold prior to complete stress relaxation of the cork granules, prior to any re-expansion of said granules which would result in rupture of said article placing said article under applied compression, cooling said recompressed article so that the temperature gradient within the mass is such that the isothermal lines are substantially parallel to the direction of applied compression, maintaining said formed article under confinement until substantially complete stress relaxation of the cork granules has been effected, and thereafter removing the article from confinement.

References Cited in the file of this patent

UNITED STATES PATENTS

| | | |
|---|---|---|
| 595,776 | Holbrook | Dec. 21, 1897 |
| 926,527 | Weinheim | June 29, 1909 |
| 2,052,899 | Scott | Sept. 1, 1936 |
| 2,167,550 | Jenkins | July 25, 1939 |
| 2,301,148 | Schwarz | Nov. 3, 1942 |
| 2,348,081 | Linzell | May 2, 1944 |